United States Patent
Foringer et al.

(10) Patent No.: US 7,872,078 B2
(45) Date of Patent: Jan. 18, 2011

(54) CURABLE FILM-FORMING COMPOSITIONS DEMONSTRATING SELF-HEALING PROPERTIES

(75) Inventors: Lyle L. Foringer, Worthington, PA (US); Constantine A. Kondos, Pittsburgh, PA (US); Richard J. Sadvary, Pittsburgh, PA (US); Kurt G. Olson, Gibsonia, PA (US); Dennis A. Simpson, Sarver, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 629 days.

(21) Appl. No.: 11/846,070

(22) Filed: Aug. 28, 2007

(65) Prior Publication Data

US 2009/0062453 A1 Mar. 5, 2009

(51) Int. Cl.
*C08G 18/00* (2006.01)
(52) U.S. Cl. .................. 525/440.01; 525/437; 525/445; 525/440.02; 525/446; 525/449; 525/453; 525/454
(58) Field of Classification Search ................. 525/437, 525/440.01, 440.02, 444, 445, 446, 449, 525/453, 454
See application file for complete search history.

(56) References Cited

U.S. PATENT DOCUMENTS 6,387,519 B1   5/2002   Anderson et al.
2004/0043152 A1*   3/2004   Barsotti et al. ............... 427/283
2004/0110895 A1   6/2004   Anderson et al.
2004/0161538 A1   8/2004   Boehme et al.
2005/0153139 A1*   7/2005   Levitt et al. ............... 428/423.1
2006/0188722 A1   8/2006   White et al.
2007/0196661 A1   8/2007   Mayo et al.

FOREIGN PATENT DOCUMENTS

WO   2006137967   12/2006
WO   2007009920   1/2007

* cited by examiner

*Primary Examiner*—David Wu
*Assistant Examiner*—Robert Jones, Jr.
(74) *Attorney, Agent, or Firm*—Robert A. Diaz; Steven W. Hays; Diane R. Meyers

(57) ABSTRACT

The present invention is directed to curable film-forming compositions comprising:
(a) a polymeric binder comprising a polyester having hydroxyl functional groups; and
(b) a curing agent comprising a polyisocyanate having at least three isocyanate functional groups. In certain embodiments, after application to a substrate as a coating and after curing, the compositions demonstrate a Fisher microhardness of at least 120 at ambient temperatures of 15 to 25° C. and a softening point greater than or equal to 35° C. Additionally, in certain embodiments, after application to a substrate as a coating and after curing, the compositions demonstrate a 20° gloss recovery of at least 75% when subjected to the DRY ABRASION TEST METHOD.

24 Claims, No Drawings

CURABLE FILM-FORMING COMPOSITIONS DEMONSTRATING SELF-HEALING PROPERTIES

FIELD OF THE INVENTION

The present invention relates generally to curable film-forming compositions that demonstrate self-healing properties.

BACKGROUND OF THE INVENTION

Automotive manufacturers have very strict performance requirements of the coatings that are used in original equipment manufacture. For example, automotive OEM clear top coats are typically required to have a combination of good exterior durability, acid etch and water spot resistance, and excellent gloss and appearance.

Topcoat film-forming compositions, particularly those used to form the transparent clear coat in color-plus-clear coating systems for automotive applications, are subject to damage from scratching and marring of the coating during the life of the vehicle. Over time, the smooth, glossy appearance of the vehicle may degrade as the vehicle is subjected to abrasions that occur, for example, during washing of the vehicle.

It would be desirable to develop curable film-forming compositions that provide a hard, highly crosslinked film that may be softened as needed to allow mar and scratch defects to recover or "heal". Such compositions would ideally have a combination of favorable performance properties particularly in coatings applications, such as superior appearance and resistance to environmental etching, spotting, and the like.

SUMMARY OF THE INVENTION

The present invention is directed to a curable film-forming composition comprising:

(a) a polymeric binder comprising a polyester having hydroxyl functional groups; and (b) a curing agent comprising a polyisocyanate having at least three isocyanate functional groups. In certain embodiments, after application to a substrate as a coating and after curing, film-forming compositions of the present invention demonstrate a Fisher microhardness of at least 120 at ambient temperatures of 15 to 25° C., and a softening point greater than or equal to 35° C. Additionally, in certain embodiments, after application to a substrate as a coating and after curing, the compositions demonstrate a 20° gloss recovery of at least 75% when subjected to the DRY ABRASION TEST METHOD.

DETAILED DESCRIPTION OF THE INVENTION

It is noted that, as used in this specification and the appended claims, the singular forms "a," "an," and "the" include plural referents unless expressly and unequivocally limited to one referent.

Other than in the operating examples, or where otherwise indicated, all numbers or expressions referring to quantities of ingredients, reaction conditions, etc., used in the specification and claims are to be understood as modified in all instances by the term "about". Various numerical ranges are disclosed in this patent application. Because these ranges are continuous, they include every value between the minimum and maximum values. Unless expressly indicated otherwise, the various numerical ranges specified in this application are approximations.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their C1-C5 alkyl esters, lower alkyl-substituted acrylic acids, e.g., C1-C5 substituted acrylic acids, such as methacrylic acid, ethacrylic acid, etc., and their C1-C5 alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The term "reactive" refers to a functional group capable of undergoing a chemical reaction with itself and/or other functional groups spontaneously or upon the application of heat or in the presence of a catalyst or by any other means known to those skilled in the art.

The present invention is directed to curable film-forming compositions. The film-forming compositions comprise a polymeric binder comprising a polyester having hydroxyl functional groups. Such polyesters may be prepared in any known manner, for example, by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Neopentyl glycol is typically used. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, which is often used, and trimellitic acid. Besides the polycarboxylic acids mentioned above, functional equivalents of the acids such as anhydrides where they exist or lower alkyl esters of the acids such as the methyl esters may be used.

The polyester used in the polymeric binder (a) typically has a hydroxyl group equivalent weight less than 250 g/equivalent, for example, less than 200 g/equivalent, or less than 175 g/equivalent, based on resin solids of the polyester itself. In certain embodiments of the present invention, the hydroxyl functional groups are attached to the polyester as terminal groups; i. e., they occur at the end of the polymer chain backbone. Additional hydroxyl groups may be pendant to the polymer chain, attached along the length of the polymer chain, such as on branches.

In certain embodiments of the present invention, the polymeric binder may further comprise a different polymer having active hydrogen functional groups. The different polymer may comprise one or more acrylic polymers, polyester, polyurethane, polyamide, polyether, polysilane, and/or silyl ether polymers with one or more different types of active hydrogen functional groups, such as pendant and/or terminal hydroxyl groups, carboxylic acid groups, amine groups, thiol groups, carbamate groups, urethane groups, amide groups, and/or urea groups. Most often the functional groups comprise hydroxyl groups. Generally these polymers can be any polymers of the types mentioned above, made by any method known to those skilled in the art. Often acrylic polyols are used.

The amount of the polymer present in the polymeric binder a) generally ranges from 10 to 90 percent by weight, such as 20 to 80 percent by weight, or 40 to 60 percent by weight, based on the total weight of resin solids (curing agent plus all polymers containing functional groups) in the film-forming composition.

The curable film-forming compositions of the present invention further comprise a curing agent b) comprising a polyisocyanate having at least three isocyanate functional groups.

The polyisocyanate may include a single trifunctional polyisocyanate or a mixture of two or more different trifunctional polyisocyanates, and may be selected from one or more polyisocyanates such as triisocyanates including isocyanurates.

Suitable trifunctional isocyanates include, but are not limited to, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylene diisocyanate sold under the name CYTHANE 3160 by CYTEC Industries, Inc., DESMODUR N 3300, which is the isocyanurate of hexamethylene diisocyanate, and DESMODUR Z 4470, a trimer of isophorone diisocyanate, both available from Bayer Corporation. Specifically used polyisocyanates are cyclic isocyanates, particularly, isocyanurates of diisocyanates such as hexamethylene diisocyanate and isophorone diisocyanate.

The polyisocyanate may also be any of those disclosed above, chain extended with one or more polyamines and/or polyols using suitable materials and techniques known to those skilled in the art, provided the resulting polyisocyanate has at least three isocyanate functional groups.

The polyisocyanates may contain free isocyanate groups for use in a two-package curable film-forming composition, or the isocyanate groups may be capped, making them suitable for use in a one-package curable film-forming composition, in accordance with the present invention. Examples of suitable capping agents include those materials which would be removed at elevated temperatures such as lower aliphatic alcohols including methanol, oximes such as methyl ethyl ketoxime, lactams such as caprolactam and pyrazoles such as dimethyl pyrazole.

In certain embodiments of the present invention, the curing agent b) may further comprise an aminoplast. Conventional aminoplast crosslinking agents are well known in the art and are described, for example, in U.S. Pat. No. 5,256,452; Col. 9, Lines 10-28. Useful aminoplast resins may be based on the addition products of formaldehyde with an amino- or amido-group carrying substance. Condensation products obtained from the reaction of alcohols and formaldehyde with melamine, urea or benzoguanamine are most common and most often used herein. While the aldehyde employed is most often formaldehyde, other similar condensation products can be made from other aldehydes, such as acetaldehyde, crotonaldehyde, acrolein, benzaldehyde, furfural, glyoxal and the like.

Condensation products of other amines and amides can also be used, for example, aldehyde condensates of triazines, diazines, triazoles, guanadines, guanamines and alkyl- and aryl-substituted derivatives of such compounds, including alkyl- and aryl-substituted ureas and alkyl- and aryl-substituted melamines. Non-limiting examples of such compounds include N,N'-dimethyl urea, benzourea, dicyandiamide, formaguanamine, acetoguanamine, glycoluril, ammeline, 3,5-diaminotriazole, triaminopyrimidine, and 2-mercapto-4,6-diaminopyrimidine. The aminoplast crosslinking agent may be monomeric or polymeric and may be partially or fully alkylated.

The amount of the curing agent b) generally ranges from 10 to 90 percent by weight, or 20 to 80 percent by weight, or 30 to 60 percent by weight, based on the total weight of resin solids (curing agent plus all polymers containing functional groups) in the film-forming composition.

In certain embodiments of the present invention, the composition may further comprise organic or, more often, inorganic particles having an average particle size less than 100 microns, or less than 50 microns, prior to incorporation into the coating composition. In other embodiments, the present invention is directed to compositions as previously described wherein the particles have an average particle size ranging from 1 to less than 1000 nanometers, or 1 to 100 nanometers, or 5 to 50 nanometers, or often 5 to 25 nanometers, prior to incorporation into the coating composition. The particles may range between any combination of these values inclusive of the recited values. Such particles are typically present in the composition in an amount of 0.1 to 10 percent by weight, often 0.5 to 5 percent by weight, based on the total weight of resin solids in the composition.

The particles can be formed from materials selected from polymeric and nonpolymeric inorganic materials, polymeric and nonpolymeric organic materials, composite materials, and mixtures of any of the foregoing. As used herein, "formed from" denotes open, e.g., "comprising," claim language. As such, it is intended that a composition "formed from" a list of recited components be a composition comprising at least these recited components, and can further comprise other, nonrecited components, during the composition's formation. Additionally, as used herein, the term "polymer" in meant to encompass oligomers, and includes without limitation both homopolymers and copolymers.

As used herein, the term "polymeric inorganic material" means a polymeric material having a backbone repeat unit based on an element or elements other than carbon. For more information see James Mark et al., *Inorganic Polymers*, Prentice Hall Polymer Science and Engineering Series, (1992) at page 5, which is specifically incorporated by reference herein. Moreover, as used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. See R. Lewis, Sr., *Hawley's Condensed Chemical Dictionary*, (12th Ed. 1993) at pages 761-762, and M. Silberberg, Chemistry *The Molecular Nature of Matter and Change* (1996) at page 586.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers*, 2nd Ed. (1999) at pages 15-202, which are specifically incorporated by reference herein.

The particles suitable for use in the coating compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example boron nitride; specific, nonlimiting examples of metal oxides are, for example zinc oxide; nonlimiting examples of suitable metal sulfides are, for example molybdenum disulfide, tantalum disulfide, tungsten disulfide, and zinc sulfide; nonlimiting suitable examples of metal silicates are, for example aluminum silicates and magnesium silicates such as vermiculite.

The particles can comprise, for example a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the cured composition of the invention is employed as a transparent topcoat, for example as a clearcoat in a multi-component composite coating composition, particles should not seriously interfere with the optical properties of the cured composition. As used herein, "transparent" means that the cured coating has a BYK Haze index of less than 50 as measured using a BYK/Haze Gloss instrument.

Nonpolymeric, inorganic materials useful in forming the particles used in the compositions of the present invention include inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In certain embodiments, the present invention is directed to compositions containing particles wherein the particles are selected from fumed silica, amorphous silica, colloidal silica, including the type disclosed in the example section of United States Patent Application Publication No. 20060188722 A2, incorporated herein by reference, alumina, colloidal alumina, titanium dioxide, cesium oxide, yttrium oxide, colloidal yttria, zirconia, colloidal zirconia, and mixtures of any of the foregoing. In other embodiments, the present invention is directed to compositions as previously described wherein the particles include colloidal silica. As disclosed above, these materials can be surface treated or untreated.

Other optional ingredients, such as colorants, catalysts, plasticizers, anti-oxidants, thixotropic agents, hindered amine light stabilizers, UV light absorbers and stabilizers may be formulated into the curable compositions of the present invention. These ingredients may be present (on an individual basis) in amounts up to 10 percent, often from 0.1 to 5 percent by weight based on total weight of resin solids of the film-forming composition. When the composition of the present invention includes aminoplast curing agents, catalysts including acid functional catalysts known to those skilled in the art as useful in aminoplast-cured compositions, such as para-toluenesulfonic acid, dodecylbenzene sulfonic acid, and the like, may be included as well.

The coatings of the present invention can also include a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming compositions of the present invention may contain color pigments conventionally used in surface coatings and may be used as high gloss monocoats; that is, high gloss pigmented coatings. By "high gloss" it is meant that the cured coating has a 200 gloss and/or a DOI ("distinctness of image") measurement of at least about 80 as measured by standard techniques known to those skilled in the art. Such standard techniques include ASTM D523 for gloss measurement and ASTM E430 for DOI measurement.

The curable film-forming compositions of the present invention may alternatively be used as one or more layers of a multi-layer composite coating composition, such as a color-plus-clear composite coating, as noted below. For example, the composition may serve as a colored base coat and/or as a transparent topcoat. The composition may also be used in combination with other coatings in a composite coating composition.

The curable film-forming compositions of the present invention may be curable at ambient temperatures or elevated temperatures, depending on the crosslinking chemistry employed. The film-forming compositions of the present invention alternatively may be used as automotive primers, electrodepositable primers, base coats, clear coats, and monocoats, as well as in industrial and other applications. They are most suitable as topcoats, in particular, clear coats and monocoats, by virtue of their self healing properties as discussed below. The compositions may be easily prepared by simple mixing of the ingredients, using formulation techniques well known in the art.

The compositions of the present invention may be applied over any of a variety of substrates such as metallic, glass, wood, and/or polymeric substrates, and can be applied by conventional means including but not limited to brushing, dipping, flow coating, spraying and the like. They are most often applied by spraying. The usual spray techniques and equipment for air spraying, airless spraying, and electrostatic spraying employing manual and/or automatic methods can be used. Suitable substrates include but are not limited to metal substrates such as ferrous metals, zinc, copper, magnesium, aluminum, aluminum alloys, and other metal and alloy substrates typically used in the manufacture of automobile and other vehicle bodies. The ferrous metal substrates may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used.

The compositions of the present invention may also be applied over elastomeric or plastic substrates such as those that are found on motor vehicles. By "plastic" is meant any of the common thermoplastic or thermosetting synthetic non-conductive materials, including thermoplastic olefins such as polyethylene and polypropylene, thermoplastic urethane, polycarbonate, thermosetting sheet molding compound, reaction-injection molding compound, acrylonitrile-based materials, nylon, and the like.

In certain embodiments, the present invention is directed to multi-component composite coating compositions comprising a basecoat deposited from a pigment-containing base coating composition, which can comprise any of the aforementioned curable coating compositions, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above. It should be understood that one or both of the base coating composition and the top coating composition can be formed from the curable coating compositions of the present invention.

Where the basecoat is not formed from a composition of the present invention (but the topcoat is formed from a curable coating composition of the present invention) the coating composition of the basecoat in the color-plus-clear system can be any composition useful in coatings applications, particularly automotive applications. The coating composition of the basecoat can comprise a resinous binder and a pigment and/or other colorant, as well as optional additives well known in the art of coating compositions. Nonlimiting examples of resinous binders are acrylic polymers, polyesters, alkyds, and polyurethanes.

The basecoat compositions can be applied to any of the substrates described above by any conventional coating techniques such as those described above, but are most often applied by spraying. The usual spray techniques and equipment for air spraying, airless spray, and electrostatic spraying employing either manual or automatic methods can be used. Resultant film thicknesses may vary as desired.

After forming a film of the basecoat on the substrate, the basecoat can be cured or alternatively given a drying step in which at least some of the solvent is driven out of the basecoat film by heating or an air drying period before application of the clearcoat. Suitable drying conditions may depend, for example, on the particular basecoat composition, and on the ambient humidity if the composition is water-borne.

The transparent or clear topcoat composition can be applied to the basecoat by any conventional coating technique, including, but not limited to, any of those disclosed above. The transparent topcoat can be applied to a cured or to a dried basecoat before the basecoat has been cured. In the latter instance, the two coatings can then be heated to cure both coating layers simultaneously.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other, for example, by inhibiting solvent/water evaporation from a lower layer. Moreover, both the first topcoat and the second topcoat can be the curable coating composition of the present invention. Alternatively, only the second topcoat may be formed from the curable coating composition of the present invention.

If the first topcoat does not comprise the curable coating composition of the present invention, it may, for example, include any crosslinkable coating composition comprising a thermosettable coating material and a curing agent.

Typically, after forming the first topcoat over the basecoat, the first topcoat is given a drying step in which at least some solvent is driven out of the film by heating or, alternatively, an air drying period or curing step before application of the second topcoat. Suitable drying conditions will depend on the particular film-forming compositions used.

The film-forming composition of the present invention when employed as a second topcoat coating composition can be applied as was described above for the first topcoat by any conventional coating application technique. Curing conditions can be those described above for the topcoat.

The curable film-forming compositions of the present invention, after being applied to a substrate as a coating and after curing, demonstrate a Fisher microhardness of at least 120 at ambient temperatures of 15 to 25° C. and a softening point greater than or equal to 35° C.

Additionally, in certain embodiments of the present invention, the curable film-forming compositions of the present invention, after being applied to a substrate as a coating and after curing, demonstrate self-healing as measured by the DRY ABRASION TEST METHOD, indicated by a 20° gloss recovery of at least 75%, often at least 80%, and even at least 90%. In the DRY ABRASION TEST METHOD, a cured coating on a substrate is subjected to testing by first measuring the 20° gloss of the coating ("original gloss"). The coating is then linearly scratched with a weighted abrasive paper for ten double rubs using an Atlas AATCC CROCKMETER, Model CM-5, available from Atlas Electric Devices Company of Chicago, Ill. The abrasive paper used is 3M 281Q WETORDRY™ PRODUCTION™ 9 micron polishing paper sheets, which are commercially available from 3M Company of St. Paul, Minn. After scratching, the coated substrate is heated to a substrate temperature of 35 to 60° C. for a duration of from 10 seconds up to overnight using any appropriate heat source such as a thermal or convection oven, liquid (i.e. warm water), heat gun, heat lamp, sunlight, other IR sources, hotroom and the like, and afterwards the 20° gloss is again measured. A coating will pass the DRY ABRASION TEST METHOD if it retains at least 60% of its original 20° gloss. Gloss retention is measured as 100%×scratched gloss/initial gloss.

Additionally, in certain embodiments of the present invention, the curable film-forming compositions of the present invention, after being applied to a substrate as a coating and after curing, demonstrate self-healing as measured by the WET ABRASION TEST METHOD ONE, indicated by a 20° gloss recovery of at least 90%, often at least 91%, and even at least 92%.

Additionally, in certain embodiments of the present invention, the curable film-forming compositions of the present invention, after being applied to a substrate as a coating and after curing, demonstrate self-healing as measured by the WET ABRASION TEST METHOD TWO, indicated by a 20° gloss recovery of at least 75%, often at least 80%, and even at least 84%.

Additionally, in certain embodiments of the present invention, the curable film-forming compositions of the present invention, after being applied to a substrate as a coating and after curing, demonstrate self-healing as measured by the WET ABRASION TEST METHOD THREE, indicated by a 20° gloss recovery of at least 65%, often at least 70%, and even at least 74%.

Additionally, in certain embodiments of the present invention, the curable film-forming compositions of the present invention, after being applied to a substrate as a coating and after curing, demonstrate self-healing as measured by the WET ABRASION TEST METHOD FOUR, indicated by a 20° gloss recovery of at least 50%, often at least 60%, and even at least 65%.

Each of the WET ABRASION TEST METHODS ONE to FOUR correspond, respectively, to the Amtec-Kistler Car Wash Test DIN 55668, run at 10, 20, 30, or 40 cycles. In the WET ABRASION TESTS ONE to FOUR, a cured coating on a substrate is subjected to testing by first measuring the 20° gloss of the coating ("original gloss"). The coating is then subjected to the Amtec-Kistler Car Wash Test DIN 55668, run at 10, 20, 30, or 40 cycles, and afterward, the coated substrate is heated to a substrate temperature of 35 to 60° C. for a duration of from 10 seconds up to overnight using any appropriate heat source such as a thermal or convection oven, liquid (i.e. warm water), heat gun, heat lamp, sunlight, other IR sources, hotroom and the like, and afterwards the 20° gloss is again measured.

The present invention is more particularly described in the following examples, which are intended to be illustrative only, since numerous modifications and variations therein will be apparent to those skilled in the art. Unless otherwise specified, all parts and percentages are by weight.

Example A

This example describes the preparation of a polyester polyol, a product of the polycondensation reaction of 2,2-dimethyl-1,3-propanediol (CAS#126-30-7) and hexahydrophthalic anhydride (CAS#85-42-7). The polyester polyol was prepared as follows:

To a suitable reaction vessel equipped with a fractionating distillation setup and a means for maintaining a nitrogen blanket, was added 3960 g of 2,2-dimethyl-1,3-propanediol, 4041 g of molten hexahydrophthalic anhydride, 8.000 g of triphenyl phosphite, and 0.810 g of butyl stannoic acid. The mixture was heated slowly with a 120° C. temperature setpoint and mechanical stirring. The exotherm peaked at 147° C., after which the mixture was held at about 120° C. for 1 hour. After 1 hour, a nitrogen sparge was introduced at a flow rate of about 0.5 scfh and the mixture was heated gradually to 210° C. When the distillation head temperature dropped below 50° C., the fractionating column was removed and the reaction was continued with a simple distillation setup. At an acid value of 3.9 mg KOH/g, the mixture was cooled to 80° C. and 1334.1 g of n-butyl acetate was added. The mixture was poured out at 60° C. and the following final properties were measured: an acid value of 3.00 mg KOH/g, a hydroxyl number of 274 mg KOH/g, a Gardner-Holdt viscosity of Z3-Z4, 82.11 percent non-volatiles (110° C. for 1 hour), a number average molecular weight of 701, and a weight average molecular weight of 1111 versus polystyrene standards.

Examples 1 to 3 demonstrate the preparation of curable film-forming compositions according to the present invention. The compositions were prepared by first mixing the separate packs of ingredients, and then combining the packs immediately prior to application to the substrates.

Example 1

| Ingredient | Solid Weight (grams) | Weight (grams) |
| --- | --- | --- |
| PACK 1 | | |
| Methyl Amyl Ketone | — | 20.00 |
| Butyl CELLOSOLVE Acetate[1] | — | 2.50 |
| Butyl CARBITOL Acetate[2] | — | 1.50 |
| TINUVIN 928[3] | 3.00 | 3.00 |
| TINUVIN 292[4] | 0.50 | 0.50 |
| Polyester Polyol of Example A | 46.70 | 51.89 |
| BYK 331[5] | 0.02 | 0.02 |
| PACK 2 | | |
| Methyl Amyl Ketone | — | 4.33 |
| DESMODUR N-3300A[6] | 53.30 | 53.30 |
| TOTAL | 103.52 | 137.04 |

[1]Solvent available from Dow Chemical Co.
[2]Solvent available from Dow Chemical Co.
[3]UV absorber available from Ciba Specialty Chemicals.
[4]Light stabilizer available from Ciba Additives.
[5]Polyether/dimethylpolysiloxane copolymer available from Byk Chemie.
[6]Hexamethylene polyisocyanate available from Bayer Material Science LLC Example 2

| Ingredient | Solid Weight (grams) | Weight (grams) |
| --- | --- | --- |
| PACK 1 | | |
| Methyl Amyl Ketone | — | 20.00 |
| Butyl CELLOSOLVE Acetate | — | 2.25 |
| Butyl CARBITOL Acetate | — | 1.00 |
| TINUVIN 928 | 3.00 | 3.00 |
| TINUVIN 292 | 0.50 | 0.50 |
| Fumed Silica Dispersion[7] | 5.10 | 11.86 |
| Acrylic Polyol[8] | 5.00 | 7.14 |
| Polyester Polyol of Example A | 39.91 | 44.34 |
| BYK 306[9] | 0.01 | 0.11 |
| BYK 331 | 0.02 | 0.02 |

-continued

| Ingredient | Solid Weight (grams) | Weight (grams) |
|---|---|---|
| PACK 2 | | |
| Methyl Amyl Ketone | — | 3.10 |
| DESMODUR N-3300A | 50.94 | 50.94 |
| TOTAL | 104.48 | 144.26 |

[7] A fumed silica dispersion consisting of 8% AEROSIL R812, a hydrophobic amorphous silica available from Degussa, milled in a polymer consisting of 39% hydroxypropyl acrylate, 20% Styrene, 19% butyl acrylate, 18% butyl methacrylate, 2% acrylic acid, 0.5% methyl methacrylate in a solvent blend of 46% Aromatic 100 type and 44% xylene and 10% isobutyl alcohol at 71% solids about 7500 Mw.
[8] A polymer consisting of 39% hydroxypropyl acrylate, 20% Styrene, 19% butyl acrylate, 18% butyl methacrylate, 2% acrylic acid, 0.5% methyl methacrylate in a solvent blend of 46% Aromatic 100 type and 54% xylene at 71% solids about 7500 Mw.
[9] Polyether/dimethylpolysiloxane copolymer available from Byk Chemie.

Example 3

| Ingredient | Solid Weight (grams) | Weight (grams) |
|---|---|---|
| PACK 1 | | |
| Methyl Amyl Ketone | — | 20.00 |
| Butyl CELLOSOLVE Acetate | — | 2.25 |
| Butyl CARBITOL Acetate | — | 1.00 |
| TINUVIN 928 | 3.00 | 3.00 |
| TINUVIN 292 | 0.50 | 0.50 |
| Fumed Silica Dispersion | 5.10 | 11.86 |
| Colloidal Silica[10] | 1.00 | 6.94 |
| Acrylic Polyol used above | 12.00 | 17.14 |
| Polyester Polyol used above | 34.11 | 37.90 |
| BYK 306 | 0.01 | 0.11 |
| BYK 331 | 0.02 | 0.02 |

-continued

| Ingredient | Solid Weight (grams) | Weight (grams) |
|---|---|---|
| PACK 2 | | |
| DESMODUR N-3300A | 43.58 | 43.58 |
| DESMODUR Z-4470BA[11] | 6.16 | 8.80 |
| TOTAL | 105.48 | 153.10 |

[10] "Silica B" prepared as described in U.S. Patent Ser. No. 11/145,812, filed Jun. 6, 2005, incorporated by reference herein.
[11] Aliphatic polyisocyanate resin solution available from Bayer Material Science LLC.

The film forming compositions (Examples 1-3) were spray applied to a pigmented basecoat to form color-plus-clear composite coatings over primed electrocoated steel panels. The panels use were ACT cold roll steel panels (10.16 cm by 30.48 cm) with ED6060 electrocoat available from ACT Laboratories, Inc. The panels were coated with HWB9517, a black pigmented water-borne basecoats available from PPG Industries, Inc. Basecoat was automated spray applied to the electrocoated steel panels at ambient temperature (about 70° F. (21° C.)). A dry film thickness of about 0.5 to 0.7 mils (about 12 to 17 micrometers) was targeted for the basecoat. The basecoat panels were dehydrated for 5 minutes@176° F. (80° C.) prior to clearcoat application.

The clear coating compositions were each automated spray applied to a basecoated panel at ambient temperature in two coats with an ambient flash between applications. Clearcoats were targeted for a 1.7 mils (about 43 micrometers) dry film thickness. All coatings were allowed to air flash at ambient temperature before the oven. Panels were baked for thirty minutes at 285° F. (140° C.) to fully cure the coating(s). The panels were tested for hardness (Fischer Microhardness). The panels were further subjected to DRY ABRASION TEST METHOD and WET ABRASION TEST METHODS ONE to FOUR to determine self-healing capabilities. Heating of the panels during testing was done by immersing the marred panel into 53° C. water for 10 minutes.

Physical Properties

Mar Gloss

| Clearcoat | Initial 20° Gloss | Fischer Microhardness | DRY ABRASION TEST METHOD Marred/(Recovery) 20° Gloss | WET ABRASION TEST METHOD Marred/(Recovery) 20° Gloss | | | |
|---|---|---|---|---|---|---|---|
| | | | | ONE | TWO | THREE | FOUR |
| Comparative[1] | 88 | 143 | 18/(40) | 62/(74) | 45/(61) | 35/(45) | 27/(36) |
| Example 1 | 88 | 139 | 14/(80) | 71/(83) | 66/(79) | 56/(71) | 54/(67) |
| Example 2 | 86 | 134 | 11/(81) | 71/(82) | 65/(78) | 58/(72) | 54/(68) |
| Example 3 | 85 | 143 | 49/(82) | 63/(78) | 51/(71) | 43/(63) | 38/(59) |

-OR-

% Gloss

| Clearcoat | Initial 20° Gloss | Fischer Microhardness | DRY ABRASION TEST METHOD Marred/(Recovery %) 20° Gloss | WET ABRASION TEST METHOD Marred/(Recovery %) 20° Gloss | | | |
|---|---|---|---|---|---|---|---|
| | | | | ONE | TWO | THREE | FOUR |
| Comparative | 88 | 143 | 20/(45) | 70/(84) | 51/(69) | 40/(51) | 31/(41) |
| Example 1 | 88 | 139 | 16/(91) | 81/(94) | 75/(90) | 64/(81) | 61/(76) |
| Example 2 | 86 | 134 | 13/(94) | 83/(95) | 76/(91) | 67/(84) | 63/(79) |
| Example 3 | 85 | 143 | 58/(96) | 74/(92) | 60/(84) | 51/(74) | 45/(69) |

[1] TKU1050AR Clearcoat commercially available from PPG Industries, Inc.

Data in the tables indicate that the curable film-forming compositions of the present invention, unlike conventional clear coats, demonstrate self-healing properties.

The present invention has been described with reference to specific details of particular embodiments thereof. It is not intended that such details be regarded as limitations upon the scope of the invention except insofar as and to the extent that they are included in the accompanying claims.

We claim:

1. A curable film-forming composition comprising:
   (a) a polymeric binder comprising a linear polyester having hydroxyl functional groups; and
   (b) a curing agent comprising a polyisocyanate having at least three isocyanate functional groups; wherein after application to a substrate as a coating and after curing, demonstrates a Fisher microhardness of at least 120 at ambient temperatures of 15 to 25° C., a softening point greater than or equal to 35° C., and a 20° gloss recovery of at least 75% when subjected to DRY ABRASION TEST METHOD.

2. The composition according to claim 1, wherein the polyester has a hydroxyl group equivalent weight less than 250 g/equivalent based on resin solids of the polyester itself.

3. The composition according to claim 1 wherein the hydroxyl functional groups are terminal hydroxyl groups.

4. The composition according to claim 1, wherein the polymeric binder further comprises a different polymer having active hydrogen functional groups.

5. The composition according to claim 4, wherein the different polymer comprises an acrylic polymer, polyester, polyurethane, polyamide, polyether, polysilane, and/or silyl ether polymer.

6. The composition according to claim 1, wherein the polymeric binder is present in the film-forming composition in an amount of 10 to 90 percent by weight, based on the total weight of resin solids in the film-forming composition.

7. The composition according to claim 1, wherein the curing agent further comprises a different polyisocyanate having at least three isocyanate functional groups and/or an aminoplast.

8. The composition according to claim 1, wherein the curing agent is present in the film-forming composition in an amount of 10 to 90 percent by weight, based on the total weight of resin solids in the film-forming composition.

9. The composition according to claim 1, further comprising organic or inorganic particles having an average particle size ranging from 1 to 100 nanometers prior to incorporation into the composition, present in the composition in an amount of 0.1 to 10 percent by weight, based on the total weight of resin solids in the composition.

10. A curable film-forming composition comprising:
    (a) a polymeric binder comprising a linear polyester having hydroxyl functional groups; and
    (b) a polyisocyanate curing agent having at least three isocyanate functional groups; wherein after application to a substrate as a coating and after curing, demonstrates a Fisher microhardness of at least 120 at ambient temperatures of 15 to 25° C., a softening point greater than or equal to 35° C., and a 20° gloss recovery of at least 60% when subjected to WET ABRASION TEST METHOD FOUR.

11. The composition according to claim 10, wherein the polyester has a hydroxyl group equivalent weight less than 250 g/equivalent based on resin solids of the polyester itself.

12. The composition according to claim 10 wherein the hydroxyl functional groups are terminal hydroxyl groups.

13. The composition according to claim 10, wherein the polymeric binder further comprises a different polymer having active hydrogen functional groups.

14. The composition according to claim 13, wherein the different polymer comprises an acrylic polymer, polyester, polyurethane, polyamide, polyether, polysilane, and/or silyl ether polymer.

15. The composition according to claim 10, wherein the polymeric binder is present in the film-forming composition in an amount of 10 to 90 percent by weight, based on the total weight of resin solids in the film-forming composition.

16. The composition according to claim 10, wherein the curing agent further comprises a different polyisocyanate having at least three isocyanate functional groups and/or an aminoplast.

17. The composition according to claim 10, wherein the curing agent is present in the film-forming composition in an amount of 10 to 90 percent by weight, based on the total weight of resin solids in the film-forming composition.

18. The composition according to claim 10, further comprising organic or inorganic particles having an average particle size ranging from 1 to 100 nanometers prior to incorporation into the composition, present in the composition in an amount of 0.1 to 10 percent by weight, based on the total weight of resin solids in the composition.

19. A substrate comprising a coating layer according to the composition of claim 1 wherein said coating layer has a Fischer microhardness of greater than or equal to 120 at a temperature ranging from 15° C. to 25° C., and wherein said coating layer has a 20° gloss recovery of at least 90% when subjected to DRY ABRASION TEST METHOD.

20. The composition according to claim 1, wherein the composition is a one-package curable film-forming composition, and the isocyanate functional groups of the curing agent (b) have been reacted with a capping agent.

21. The composition according to claim 1, wherein the composition is a two-package curable film-forming composition, and the polyisocyanate in the curing agent (b) contains free isocyanate groups.

22. The composition according to claim 1, wherein the composition further comprises color pigments and is suitable for use as a high gloss monocoat.

23. The substrate according to claim 19, wherein the coating layer contains color pigments and is a high gloss monocoat.

24. A curable film-forming composition comprising:
    (a) a polymeric binder comprising a polyester having hydroxyl functional groups and a hydroxyl equivalent weight of less than 200 g/equivalent based on resin solids of the polyester itself; and
    (b) a curing agent comprising a polyisocyanate having at least three isocyanate functional groups; wherein after application to a substrate as a coating and after curing, demonstrates a Fisher microhardness of at least 120 at ambient temperatures of 15 to 25° C., a softening point greater than or equal to 35° C., and a 20° gloss recovery of at least 75% when subjected to DRY ABRASION TEST METHOD.

* * * * *